UNITED STATES PATENT OFFICE.

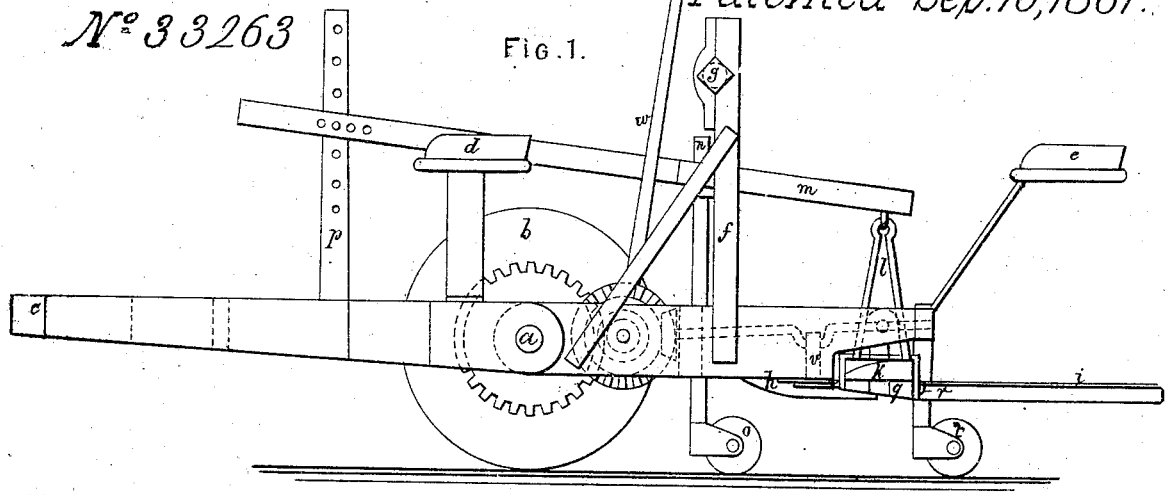
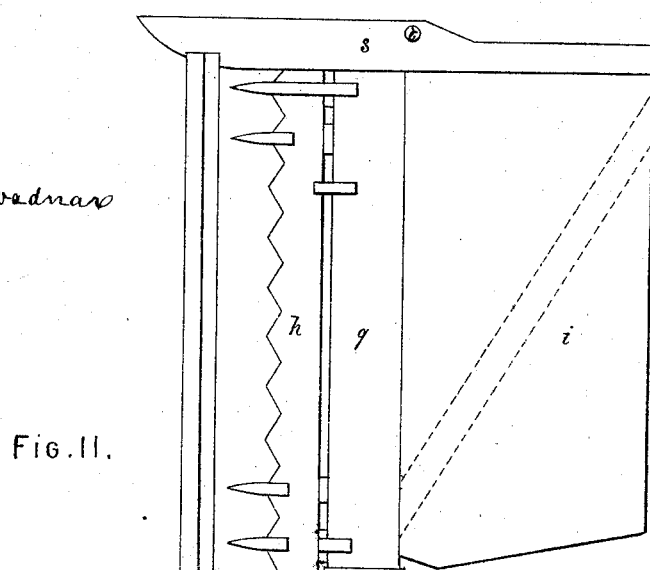
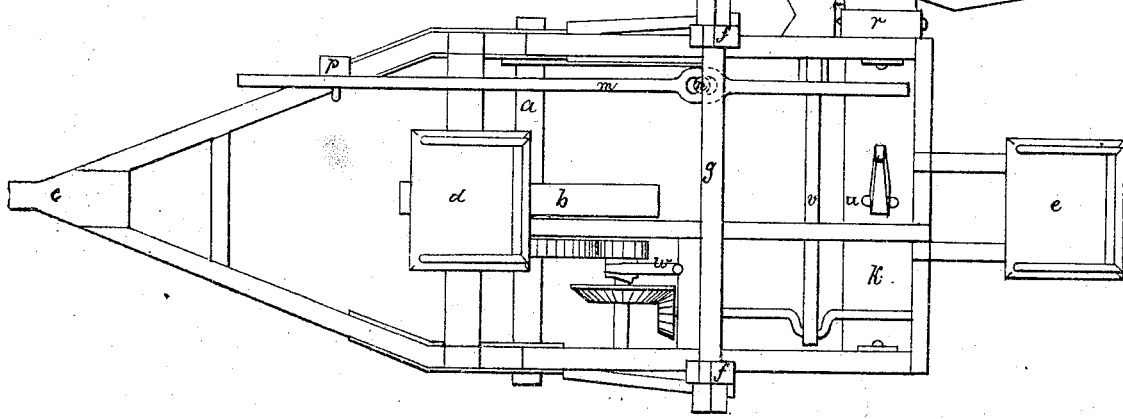

WORDEN P. PENN, OF BELLEVILLE, ILLINOIS.

IMPROVEMENT IN HARVESTERS.

Specification forming part of Letters Patent No. 33,263, dated September 10, 1861.

*To all whom it may concern:*

Be it known that I, WORDEN P. PENN, of Belleville, in the county of St. Clair and State of Illinois, have invented certain new and useful Improvements in Harvesters; and I do hereby declare that the following is a full, clear, and exact description of the same, reference being had to the annexed drawings, making a part of this specification, and to the letters of reference marked thereon.

This machine relates to mowing and reaping, in which the driver may readily adjust the height from the ground at which the sickle operates, and in which, also, there is a provision made that enables the sickle to conform with the inequalities of the ground.

It consists of a jointed frame, which may be tilted by a lever in connection with a caster roller or wheel, to raise the sickle to any required height, and an independent frame, carrying the sickle, fingers, and platform, that is jointed to the main frame in such a manner that it may be rigidly connected therewith, or left to work loosely on the joint and conform to the inequalities of the ground at any height that may be regulated by the tilting of the frame, and a second caster-roller carrying the outer end of the platform.

To enable others skilled in the art to make and use my invention, I will proceed to describe its construction and operation.

Figure 1 of the drawings is a side elevation of my said improved reaping and mowing machine or harvester, and Fig. 2 is a plan of the same.

The main frame is composed of two parts, jointed together at the axle $a$ of the wheel $b$. The forward portion of the frame is made in a triangular shape, and carries the tongue $c$, and the seat $d$ for the driver. The hinder portion of the frame carries the seat $e$ for the assistant, the standards $f$ for the support of the gathering wheel or reel, shaft $g$, and the sickle $h$, and the platform $i$ and the machinery connected therewith, and by which the sickle is operated. The transverse beam $k$ is pivoted at each end to the rear end of the frame, and carries a standard, $l$, that is secured to the end of the lever $m$, that rests on a collar of the upright $n$ of the caster-wheel $o$, and is furnished with holes at the other end for the reception of a pin fitting into corresponding holes in the standard $p$. By pressing down the end of the lever near the driver's seat, the rear portion of the frame is lifted upon the caster-wheel $o$ as a fulcrum, and by shifting the lever backward the beam $k$ is retained in a horizontal position. The holes in the standard $p$ serve to adjust the height of the sickle, and the corresponding holes in the lever serve to counteract the angularity incident to the tilting of the rear portion of the frame. The sickle $h$ and the platform $i$ are supported by the finger bar or beam $q$, which is pivoted at $r$ to a strap on the beam $k$, and is framed at its outer end to a longitudinal beam, $s$, that rests on the caster-wheel $t$. The height of the sickle at one end, therefore, is determined by the position of the hinder frame of the machine, and at the other end by the adjustable height at which it is carried by the upright of the caster-wheel $t$. The beam $q$ may be rigidly secured to the frame by the pin $u$, that passes through a hole in the upright, that is mortised into the end of the beam $q$ and projects through the beam $k$; and if the pin is removed or placed in a higher hole in the upright, the latter plays loosely through the hole in the beam $k$ as the finger-bar vibrates on the joint $r$. The fingers may be extended over the top of the sickle and fastened to the top of the finger-bar; or they may be extended and secured on the under side of the finger-bar; or they may be fastened by lateral flanges to the edge of the finger-bar, all of which plans are shown on the drawings. The sickle works in slots in the finger-guards, and has a bracket for a cleaner furnished on its under side. The sickle is operated by the pitman-rod $v$ by means of the crank-shaft and gearing proceeding from the axle $a$ and controlled by the clutch-handle. The pitman-rod $v$ may be double-jointed, or have a universal joint, by which it may accommodate itself to the angularity of action caused by the tilting and adjustment of the frame and sickle. The beam $s$ and the finger-bar $q$ are braced by a diagonal brace or beam under the platform. The standards or posts $f$ of the gathering-wheel shaft are braced by diagonal braces to the frame, which may be constructed in any suitable manner to fulfill the requirements of the operation of the machine, as described, but which I prefer should be made in the manner illustrated in the drawings.

I claim as my invention and desire to secure by Letters Patent—

1. The combination of the jointed frame by which the sickles may be elevated with the means for counteracting the angularity that would otherwise affect the operation of the sickle, and with a finger-bar that may be either flexible or rigid, the whole constructed and arranged in the manner described.

2. Connecting the finger-bar to the frame by means of the hinge-joint and the upright in the manner described, so that the connection with the frame may be made either flexible or rigid, as specified.

W. P. PENN.

Witnesses:
F. D. BELCOUR,
A. J. FARIS.